US008090597B1

(12) United States Patent
Pienkos

(10) Patent No.: US 8,090,597 B1
(45) Date of Patent: Jan. 3, 2012

(54) SYSTEM AND METHOD FOR PROVIDING REDUCED INSURANCE PREMIUMS

(75) Inventor: John Thaddeus Pienkos, Milwaukee, WI (US)

(73) Assignee: Innovaport LLC, Milwaukee, WI (US)

( * ) Notice: Subject to any disclaimer, the term of this patent is extended or adjusted under 35 U.S.C. 154(b) by 2076 days.

(21) Appl. No.: 09/694,402

(22) Filed: Oct. 22, 2000

(51) Int. Cl.
*G06Q 40/00* (2006.01)
(52) U.S. Cl. .......................................................... 705/4
(58) Field of Classification Search .................. 705/2, 3, 705/4; 600/300
See application file for complete search history.

(56) References Cited

U.S. PATENT DOCUMENTS

| | | | |
|---|---|---|---|
| 4,359,631 A | 11/1982 | Lockwood et al. | |
| 4,567,359 A | 1/1986 | Lockwood | |
| 4,831,526 A * | 5/1989 | Luchs et al. ...................... | 705/4 |
| 5,309,355 A | 5/1994 | Lockwood | |
| 5,537,315 A * | 7/1996 | Mitcham ........................... | 705/4 |
| 5,576,951 A | 11/1996 | Lockwood | |
| 5,845,256 A * | 12/1998 | Pescitelli et al. .................. | 705/4 |
| 5,855,005 A * | 12/1998 | Schuler et al. .................... | 705/4 |
| 5,873,066 A * | 2/1999 | Underwood et al. ............. | 705/4 |
| 5,990,886 A * | 11/1999 | Serdy et al. ..................... | 715/752 |
| 6,064,970 A * | 5/2000 | McMillan et al. ................ | 705/4 |
| 6,208,973 B1 * | 3/2001 | Boyer et al. ....................... | 705/2 |
| 6,272,528 B1 * | 8/2001 | Cullen et al. .................. | 709/202 |
| 6,289,319 B1 | 9/2001 | Lockwood | |
| 6,380,953 B1 * | 4/2002 | Mizuno .......................... | 715/764 |
| 6,684,189 B1 * | 1/2004 | Ryan et al. ......................... | 705/4 |
| 6,711,495 B1 * | 3/2004 | Ukai et al. ..................... | 701/207 |
| 7,010,508 B1 | 3/2006 | Lockwood | |
| 2002/0022976 A1 * | 2/2002 | Hartigan .......................... | 705/4 |

OTHER PUBLICATIONS

U.S. Appl. No. 60/205,477.*
Quicken (Quicken website, Accessed from www.archive.org, dated Dec. 12, 1998).*
Felton (Felton, Bruce, "Rental Car Insurance: Staying out of financial potholes," The New York Times, Mar. 23, 1997, p. 3, 11).*
Eskenazi, Stuart, "Idle Autos May Get Insurance Break," Jul. 24, 1993, Austin American Statesman, p. B.1.*
Cole, Nicola, "Avoid Car-Hire Pitfalls; Weekend Money," The Times, London, Jun. 4, 1994.*
The Belfast News Letter, "Your Money: Gearing Up for a Break," Jul. 28, 1998, p. 27.*
Short Term Insurance, Norwich Union website, www.norwichunion.com/short-term-insurance/index.htm, accessed May 17, 2006.*
Quicken website, Accessed from www.archive.org, dated Dec. 12, 1998).*
Felton, Bruce, "Rental Car Insurance: Staying out of financial potholes," The New York Times, Mar. 23, 1997, p. 3, 11).*
Home page of E-Insure Services, Inc., found at www.einsure.com, dated Dec. 26, 2000.
Web pages of Esurance Inc., obtained at www.esurance.com, printed on Jun. 3, 2007, 8 pages.

* cited by examiner

*Primary Examiner* — Robert Morgan
*Assistant Examiner* — Michael Fuelling

(57) ABSTRACT

The present invention relates to a system and method for providing insurance coverage to a customer. The method includes providing a field for an input of a limitation relating to a desired insurance coverage. The limitation includes at least one of a time period indication of a time period less than a month and a geographical region indication of a geographical region smaller in size than an entire nation. The method further includes receiving the limitation at a central processor. The method additionally includes performing processing in relation to the limitation to determine whether the desired insurance coverage as restricted by the limitation can be provided. The method further includes sending a confirmation concerning whether the desired insurance coverage corresponding to the limitation can be provided.

1 Claim, 4 Drawing Sheets

FIG. 3

SYSTEM AND METHOD FOR PROVIDING REDUCED INSURANCE PREMIUMS

FIELD OF THE INVENTION

The present invention relates to the obtaining of insurance for automobiles, boats and other types of insurance. In particular, the present invention relates to a system and method for providing reduced insurance premiums.

BACKGROUND OF THE INVENTION

Automobile insurance is a necessity for virtually all automobile owners in the United States and in many other countries. The price of automobile insurance typically is high, and premium payments for automobile insurance during the course of a single year often equal a significant proportion of the resale value of the insured vehicle. The price of automobile insurance is even higher for persons who, for any of a variety of reasons, do not have perfect driving records. Automobile insurance in part is expensive because of the variety of types of specific insurance that are required. For example, automobile insurance can include collision insurance for accidents caused by the insured, uninsured or underinsured motorists insurance coverage for accidents in which the insured driver or his property are harmed by another who does not have proper insurance, and comprehensive insurance for damage to the insured vehicle that does not occur during an accident with another vehicle.

Although automobile insurance is expensive for all automobile owners, automobile insurance is particularly expensive for the owners of luxury and other high-priced vehicles. The automobile insurance is expensive for several reasons, including the high value of the automobiles involved, and also because such cars are popular targets for automobile theft. Owners of sports cars typically must pay particularly exorbitant rates for their automobile insurance, particularly if the owners are male, young and unmarried, because of the increased probability of reckless driving. Additionally, luxury automobile insurance is often priced at a premium relative to other automobile insurance because such insurance is a specialty, luxury good for which the market will bear a higher price.

Insurance for luxury automobiles is particularly costly in view of the fact that many individuals who own and drive luxury automobiles only do so on a limited basis. In particular, many individuals limit their usage of their luxury automobiles to very restricted times. For example, owners of expensive sports cars often only drive their cars during the summer months. Moreover, these owners often restrict their driving of their sports cars to even narrower periods of time such as weekends or evenings. Further, many individuals limit their usage of their luxury automobiles to within restricted geographical regions such as certain suburbs, or limit their usage in other ways. Thus, it would be desirable for many luxury automobile owners to have an option to purchase limited insurance coverage for their automobiles that was restricted to cover operation of the automobiles only during such restricted periods of time, to within such restricted geographical regions, or in accordance with other restrictions.

Despite these preferences of luxury automobile owners for only limited driving, conventional systems for providing insurance require an automobile owner to obtain more extensive insurance coverage that is not restricted to cover only the limited driving of the owners. For example, conventional systems of insurance companies typically require that an automobile owner pay for insurance for at least one month at a time, if not longer, and insurance that is applicable to driving within an entire country. Although many conventional systems for providing automobile insurance require insurance applicants to provide certain minimal information relating to the intended usage of the insured automobile such as, for example, the residence location at which the automobile owner will usually park the automobile, the providing of this information does not allow insurance applicants to obtain insurance coverage that is accurately tailored to their driving preferences. Indeed, the required information typically is only (at most) indirectly indicative of the true driving preferences of the insurance applicants, and the insurance provided is not strictly limited to usage in accordance with the specified information. For example, residence information is only indirectly indicative of the areas in which an automobile will be driven and, even though a particular residence is specified by an insurance applicant, the insurance applicant need not always park the automobile in the residence location specified once the insurance is being provided.

It would therefore be advantageous for automobile owners, particularly luxury automobile owners, to be able to obtain insurance coverage that was more closely restricted to their exact times of usage of their automobiles. It would additionally be advantageous for such automobile owners to be able to obtain insurance coverage that was tailored more closely to the owner's needs in terms of other factors such as geographical regions of usage. It would further be advantageous for automobile owners if a system existed that allowed the automobile owners to easily and repeatedly specify, to an automobile insurance company or other related party, a variety of conditions under which the owners would or would not drive or otherwise utilize their automobiles. It would further be advantageous for automobile owners if the system facilitated the creation of contractual arrangements between the automobile owners and automobile insurance providers according to which insurance coverage would be provided only for automobile operation during the specific times, within the specified regions of usage, or corresponding to other criteria chosen by the automobile owners. It would additionally be advantageous if a similar system existed for providing insurance with respect to other insurable items, such as boats.

SUMMARY OF THE INVENTION

The present inventor has realized that a new internet-based system can be provided that will allow insureds to specify limited times, geographical regions, or other restrictions concerning their usage of their automobiles, boats or other insured items, in order to obtain insurance coverage limited to these specified restrictions. In one embodiment, the system requires that potential insureds first set up a general insurance relationship or arrangement with an insurance company whereby the potential insured provides all necessary information regarding the item to be insured, the insured's personal characteristics, and other information excepting the specific time or geographical ranges within which the potential insured desires to actually obtain insurance coverage (or excepting information regarding some other restrictive characteristic of the insurance policy that the insured wishes to specify at a later time). Upon establishing such a general insurance arrangement, by way of the internet-based system or otherwise, the insured can then or at later times or under different circumstances specify the exact times and/or regions (or other circumstances) for which the insured desires insurance coverage. The insured can specify this information, which may vary frequently or be carefully tailored to the insured's needs, through the use of the system, which makes entry of this information both quick and simple. The insured can gain entry to the system, once the insured has established the general insurance arrangement, by providing an identification code such as a username and password to the system.

In particular, the present invention relates to a method of providing insurance coverage to a customer. The method includes providing a field for an input of a limitation relating to a desired insurance coverage. The limitation includes at least one of a time period indication of a time period less than a month and a geographical region indication of a geographical region smaller in size than an entire nation. The method further includes receiving the limitation at a central processor. The method additionally includes performing processing in relation to the limitation to determine whether the desired insurance coverage as restricted by the limitation can be provided. The method further includes sending a confirmation concerning whether the desired insurance coverage corresponding to the limitation can be provided.

The present invention additionally relates to a computer-readable storage medium containing computer executable code for instructing a computer to operate in a particular manner. In particular, the computer is instructed to, during a preliminary period of time, receive an initial inquiry from a customer, receive customer information following entry of the customer information into an input form, and provide a preliminary indication that the customer will have an ability to order at least one of temporally-limited amounts of insurance and geographically-limited amounts of insurance. The computer is additionally instructed to, during a later time, receive a customer specification setting at least one of time limits and geographical limits regarding a desired amount of insurance coverage, wherein the time limits specify a time period of less than a month and the geographical limits specify a geographical region smaller in size than an entire nation, and determine whether the desired insurance coverage within the limits can be provided.

The present invention further relates to a computer system for arranging that limited amounts of insurance coverage are provided to customers. The computer system includes a server computer capable of hosting an insurance provider website and being coupled to the internet for providing a user interface, sending data in the form of web pages over the internet to at least one client computer, and receiving data provided at the at least one client computer by a user by way of the user interface. The web pages include at least one of a first web page capable of allowing a user to specify a temporal limitation for an insurance policy, the temporal limitation specifying a time period of less than a month, and a second web page allowing a user to specify a geographical limitation for the insurance policy, the geographical limitation specifying a geographical region that is smaller in size than an entire nation.

BRIEF DESCRIPTION OF THE DRAWINGS

FIGS. 3A-3D are schematic diagrams of exemplary web pages of a web site that can be implemented by the system of FIG. 1.

DETAILED DESCRIPTION OF THE DRAWINGS

Figure 1:
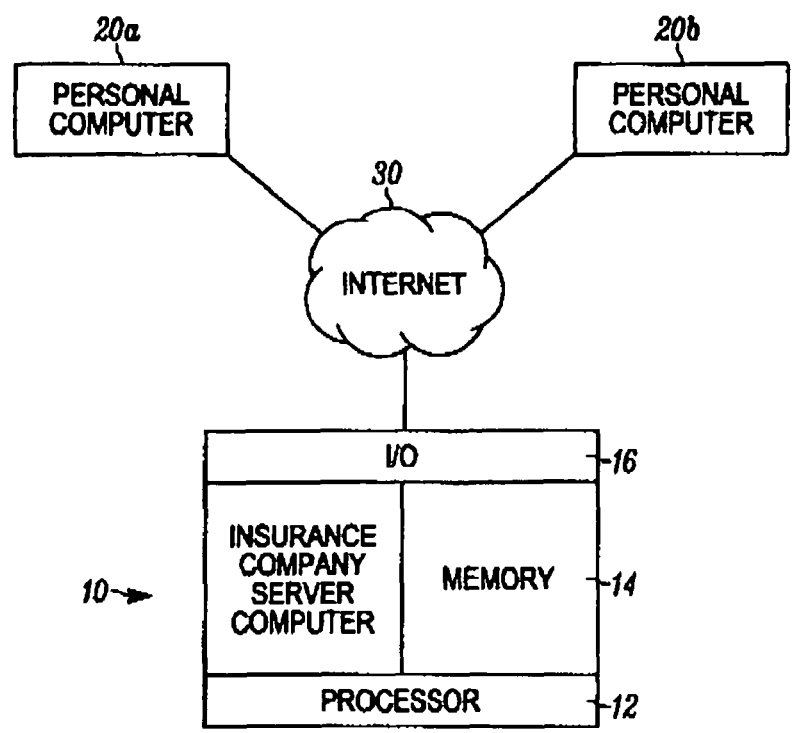
FIG. 1 is a schematic block diagram of a system for obtaining reduced automobile insurance premiums in accordance with one embodiment of the present invention.

Referring to FIG. 1, a preferred embodiment of a system for obtaining reduced automobile insurance premiums includes a server computer 10 coupled to one or more client computers 20 by way of the internet (e.g., the world wide web) 30. Two client computers 20a and 20b are shown for generality, and only one client computer or many client computers can also be included in the system. The client computers 20, which typically are (but need not be) personal computers as shown, are used by individuals to connect to the internet and to access web pages of web sites by way of browser programs. The internet communications can occur by way of standard telephone wires or other communications technologies, including wireless communications technologies. The server computer 10 can be a single computer that stores web page information, and communicates that information to client computers 20 via the internet 30 in response to the commands of browser programs. The design of each of server computer 10, client computers 20 and the internet 30, as well as the browser programs, for allowing internet-based communications, is well understood in the art. However, depending upon the embodiment of the software employed in the system, discussed below, the server computer 10 can be understood to include more than one computer, which can in turn be interlinked among one another by way of the internet 30 or by way of conventional telecommunications lines, other electronic linkages, or other communications pathways (e.g., wireless communications).

In the preferred embodiment, the server computer 10 includes an input/output port 16 which governs communication between the server computer and the interne 30, as well as at least one processing device 12 and at least one memory device 14, which are all known in the art. The system for providing reduced insurance premiums of the present invention typically includes one or more software programs that are stored in the memory device 14 and are executed by the processing device 12. The software programs can be written in any of a variety of known computer language formats, and in the preferred embodiment include software instructions necessary to provide the web pages discussed below with respect to FIGS. 3A-3D, which can be written in html (hypertext markup language). In alternate embodiments, other networks of computers and similar systems can be employed in place of computers 10,20, and internet 30.

Figure 2A:
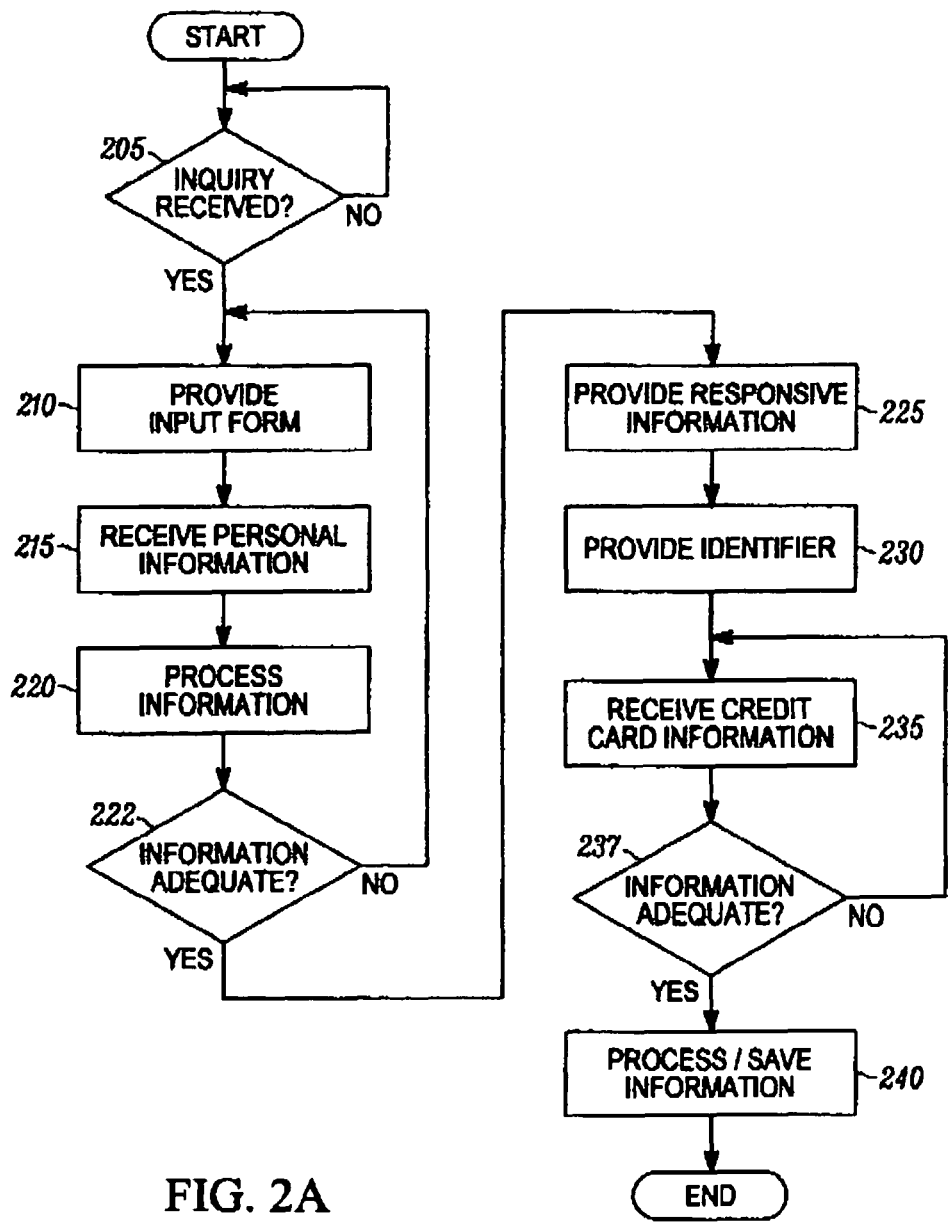
FIGS. 2A & 2B are flow charts showing exemplary steps of operation of the system of FIG. 1.
Figure 2B:
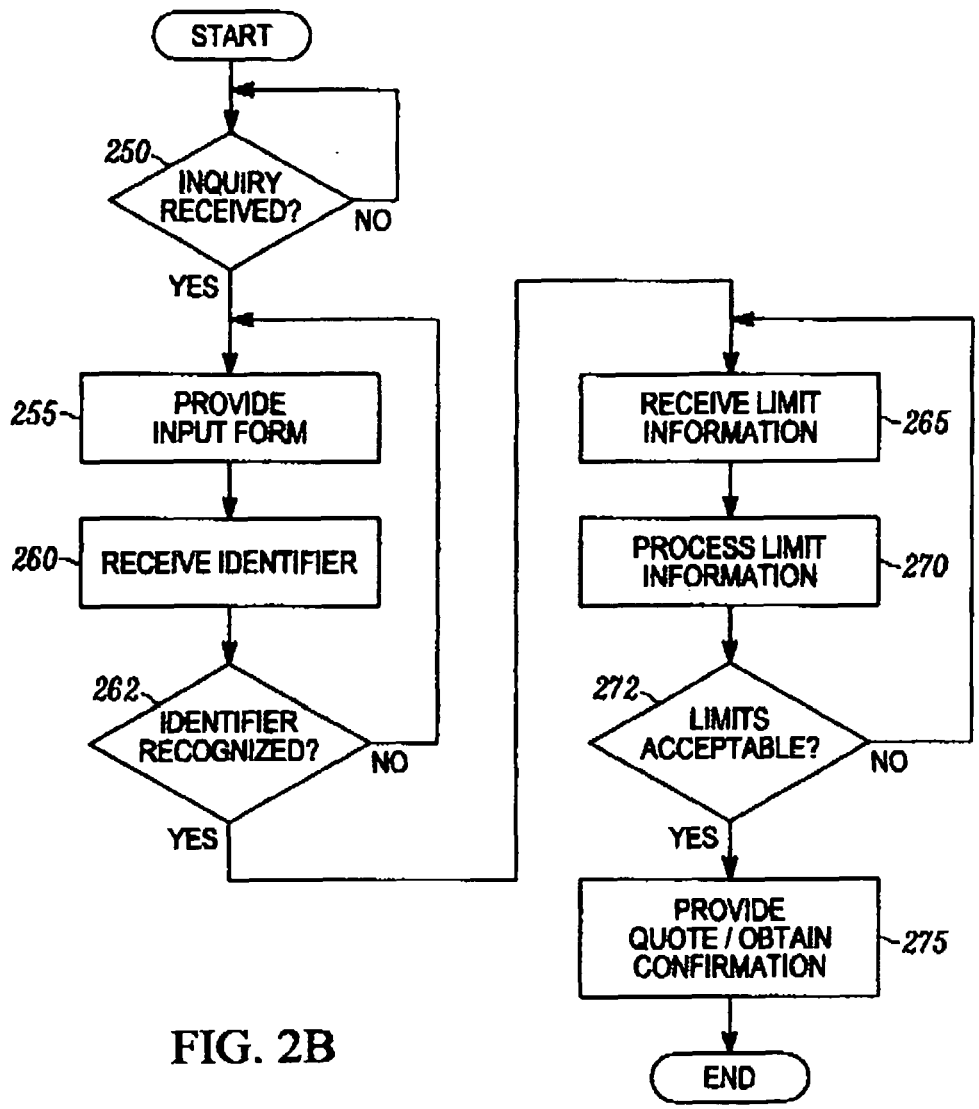

Referring to FIGS. 2A and 2B, exemplary steps of operation of the system of FIG. 1 include two primary groupings of steps. The steps of FIG. 2A include steps relating to an arrangement of general terms of an insurance policy between an insured and an insurance company, which usually includes the providing of some information regarding the past history, future intentions and other characteristics of the insured to the insurance company. Such an arrangement of general terms ("initial arrangement") is typically necessary before the system can operate to provide specific targeted insurance to cover particular limited time periods or geographical regions, or insurance limited to coverage with respect to other particular criteria. The steps of FIG. 2B include steps relating to the further arrangement between the insured and the insurance company of particular limited amounts of insurance which are to be provided in accordance with the initial arrangement developed by way of the steps of FIG. 2A. Based upon the steps of FIG. 2B, the insured and insurance company conclude one or more actual agreements as to what specific insurance coverage is being or will be provided ("concluding arrangement").

Specifically with respect to FIG. 2A, the steps concerning the initial arrangement of general terms of the insurance policy begin with the receiving of an inquiry at the server computer 10 from a potential insured concerning the setting up of an insurance policy, at step 205. As shown, the system only proceeds beyond step 205 once an inquiry has been received. Such an inquiry can be provided merely by the fact that the potential insured, by way of one of the client computers 20, provides a command to access the insurance company's website that is hosted at the server computer 10. The command can include a command to download one or more of the web pages of the insurance company's website. Alternately, the inquiry can be a specific signal provided from the client computer 20 of the potential insured that indicates the potential insured's interest in obtaining insurance from the insurance company. In one embodiment, such a signal is provided when the potential insured selects a button displayed on a web page of the insurance company, where the web page displays the message "Interested in buying insurance? If so, click here" near or on the button. In certain embodiments in which more than one type of insurance is offered by the insurance company, a web page of the website of the insurance company lists or otherwise displays the selectable types of insurance. The potential insured then provides the inquiry of step 205 by selecting one of the types of insurance, for example, by clicking on a word, icon or button indicative of that type of insurance. In further embodiments, the inquiry signal is provided when the potential insured clicks on a banner ad, link or bar within a third party web page, where the banner ad, link or bar is linked to the insurance company's web site.

Upon receiving the inquiry from the potential insured at step 205, the server computer 10 then responds at step 210 by providing an input form back to the client computer 20, at which the input form is displayed by way of the browser program. The input form includes fields for the entry of a variety of information that is required to be provided by the potential insured in order for the insurance company to determine whether and (in certain circumstances) at what cost it can provide the potential insured with insurance. Typically, the fields include fields for basic identification information concerning the potential insured such as the name of the potential insured, the birth date of the insured, the social security number of the insured, and the address of residence of the potential insured. To the extent that the insurance company offers more than one type of insurance, e.g., automobile insurance, boat insurance, and renters insurance, the potential insured in some embodiments is required to specify the desired type of insurance. In other embodiments, however, the input form does not include a field for the type of insurance insofar as the inquiry (or inquiries) originally made by the potential insured at step 205 has the dual effect of not only indicating that insurance is desired but also indicating the type of insurance that is desired.

Assuming that the type of insurance that is desired by the potential insured is already known, the input form provided at step 210 typically includes additional fields for entering specific information that is required for providing the type of insurance desired. In one embodiment, specifically with respect to automobile insurance, these fields include fields for the make and type of the automobile (e.g., Acura NSX, T-top), the year of manufacture of the automobile, the Vehicle Identification Number (VIN) number, the expected drivers of the automobile (which can include further identification information as discussed above), the yearly expected mileage on the automobile, the current mileage on the automobile, and the primary residence at which the automobile is based. These fields also can include fields for the input of information regarding the driving history of the expected drivers of the automobile, as well as information concerning the expected driving routes for the automobile (e.g., whether the automobile will be driven back and forth to work or merely for pleasure).

Upon providing the necessary input form at step 210 to the client computer 20, the system then receives information back from the potential insured at step 215. The information is provided by the potential insured by filling out the input form or forms provided at step 210 and then submitting the information. (The information is "personal" insofar as it pertains to the personal needs of the potential insured.) Upon receiving such general information concerning the type of desired insurance, the potential insured, and the extent of coverage, the insurance company has sufficient information to determine whether it can offer insurance to the potential insured. Also, in the preferred embodiment, as shown in FIG. 2A, the information received by the system is sufficient to determine basic prices (or target prices or ranges of prices) at which the system can offer limited insurance as discussed above. The ability of the system to determine whether and at what cost insurance can be provided based upon this general information received from the potential insured will depend upon the amount and types of information received, and the reliability of that information.

Steps 210 and 215 are meant to be exemplary of the manner in which the system of FIG. 1 interacts with a potential insured to obtain basic information from which an initial arrangement of general insurance policy terms can be established. In the preferred embodiment, such basic information is obtained first so that later an insured can easily and rapidly obtain limited amounts of insurance coverage without having to provide large amounts of additional information to the insurance company for processing. Particularly in the case where the insured desires to obtain insurance coverage that is temporally limited to short periods of time, it is advantageous to streamline the process of obtaining the short-term coverage when it is needed, by requiring only a minimum of additional information from the insured at that time. Consequently, in the preferred embodiment, virtually all relevant information concerning the characteristics of the insured is determined prior to those times or circumstances at which the limited insurance is desired so that, when the limited insurance is desired (or a change in the insurance coverage is desired), the insured need only provide a bare minimum of information in order to activate (or change) the limited insurance coverage.

As discussed, however, there are circumstances in which an insured (or potential insured) wishes primarily to obtain insurance coverage that is limited to specific geographic regions or with respect to other characteristics, rather than to specific, short time periods. In such embodiments, when the limitations of the insurance coverage are not temporal limitations, the distinction between obtaining information for an initial arrangement in one set of steps (as in FIG. 2A) and obtaining specific information for a concluding arrangement in a second set of steps (as in FIG. 2B) need not always be as clearly maintained. Indeed, in certain embodiments, all insurance information, including the information regarding the specifically-desired limitations on the insurance coverage, can be obtained at the same time or at nearly the same time. This can be the case also in circumstances where the limited time periods of insurance coverage desired by the potential insured are highly regular, for example, automobile insurance is desired every single weekend of the year.

Nevertheless, it typically will remain the case that the insurance information should be provided in two sets of steps even under these circumstances, since a potential insured may wish to frequently change the geographical scope of its insurance coverage or other characteristics of its coverage. That is, the entry of information in two sets of steps allows not only for insureds to easily obtain on short notice limited insurance coverage for limited time periods, but also allows insureds to make frequent adjustments in a variety of characteristics of their insurance coverage. Such other characteristics could include, in addition to geographical limitations, for example, limitations on the number of miles that can be driven under the insurance policy, limitations on the number of miles that can be driven during a given time period, and limitations on the velocity at which driving will occur. The present invention is meant to cover any of a variety of embodiments in which a potential insured at a first instance provides various information concerning desired insurance coverage, and at a second instance provides additional, new or modified information which more accurately specifies or clarifies (or corrects) the desired terms of the insurance coverage (including embodiments where, at the second instance, earlier-specified information is deleted or nullified).

Further, depending upon the embodiment of the invention as well as the type of insurance being provided, the specific characteristics of the input form provided at step 210 and the manner in which information is received by the server computer 10 at step 215 will vary. In some embodiments, multiple input forms will be provided. For example, in one embodiment, a first input form is provided concerning identification of the potential insured and the type of insurance that is desired, and a second input form is later provided concerning additional information that is necessary with respect to obtaining the type of insurance that is desired. In other embodiments, the information is provided in a sequence of entry forms. For example, separate input forms can be provided with respect to the nature of the automobile and then for the characteristics of each of the expected drivers of the automobile. Further, in still other embodiments, instead of providing one or more input forms to a potential insured at client computer 20, the system instead prompts a potential insured with a series of questions to which the potential insured is requested to respond. Many other embodiments in which different steps are employed allowing a potential insured to provide information to the server computer 10 are also to be encompassed within the scope of the invention.

Once all of the appropriate information is received by the system at step 215, the server computer 10 (or one or more other computers coupled thereto) then processes the information to determine whether the insurance that is desired can be provided and/or at what cost such insurance can be provided at step 220. The server computer 10 also processes the information to determine whether for some reason the information received at step 215 is insufficient or in error. If at step 222 this is determined to be the case, the system returns to step 210, at which the system attempts again to obtain the necessary information. In certain embodiments, an error message or other descriptive message is provided to the potential insured at this time indicating, for example, that the information provided earlier by the potential insured was incorrectly entered or incomplete. In other embodiments, the system merely displays at step 210 a new input form or set of input forms for the input of required information.

In some embodiments, the information processing by the server computer 10 at step 220 merely involves a small amount of reformatting of the data received from the client computer 20 in order for that data to be analyzed or studied by personnel of the insurance company. That is, it is the company personnel who make the determinations of whether the obtained information is adequate and, based upon this information, whether the insurance can be provided and/or at what cost such insurance can be provided. Indeed, in some embodiments, the information processing is as minimal as electronic transmission of the signals provided from the client computer 20 at step 215 onto a CRT or computer screen associated with server computer 10, which can be viewed by insurance company personnel. In more sophisticated embodiments, however, the server computer 10 (or one or more other computers coupled thereto) includes programming by which the server computer can automatically determine the adequacy of the information received from the potential insured, and the feasibility of the insurance requested by the potential insured and/or the price of such insurance. The exact nature of such programming will vary depending upon the embodiment of the invention, the type of insurance, and a variety of other factors. Examples of such programming can involve actuarial formulas, tables and other information, expert systems, and a variety of types of insurance calculation tools.

As shown, FIG. 2A also includes five additional steps 225-240. Assuming that the information received from the client computer 20 at step 215 was determined to be adequate, the server computer 10 proceeds from step 222 to step 225 at which it provides information to the client computer 20 that is responsive to the information received in step 215. The responsive information generally concerns the availability and/or cost of insurance coverage that is applicable to the potential insured. For example, the server computer 10 can provide information indicating that the insurance company is indeed able to provide the type of insurance requested by the potential insured, based upon the particular characteristics and needs specified by the potential insured at step 215. Also, for example, the server computer 10 can provide information regarding a general rate of insurance pricing that applies to the potential insured based upon the information provided by the potential insured. Also, the server computer 10 can provide information indicating special deals that are available for lower pricing of insurance that appear to be relevant to the potential insured's needs. Or, in alternate embodiments, no particular information need be sent. Assuming that it has been determined that the requested type of insurance can indeed be provided to the potential insured, at step 230 one or more identification codes such as a username and/or password for the potential insured are also then provided to the client computer 20 from the server computer 10. The identification codes/identifiers allow the potential insured to more easily "log in" to the server computer 10 the next time the potential insured wishes to interact with the insurance company, particularly when the potential insured wishes to obtain specific limited amounts of insurance coverage or to change its existing insurance coverage.

At step 235, the server computer 10 receives credit card or other payment information from the potential insured. Such information is often necessary so that later, when the potential insured attempts to purchase limited amounts of insurance coverage, it is not necessary to finalize payment arrangements. In certain embodiments, the payment information received in step 235 is instead received in step 215 as part of the information submitted in one of the input forms. Step 235 is further includes processing of the credit card information or other payment information from the potential insured by the server computer 10 or by another computer, such as a computer of a credit card company, for example, to determine whether the payment information is accurate or adequate for obtaining payment. If the credit card information or other payment information is determined not to be adequate, at step 237 the system returns to step 235 to obtain additional or modified payment information. In certain circumstances, a payment is immediately obtained, e.g., as a retainer for future insurance coverage. Once proper payment information has been obtained, the server computer 10 at step 240 further processes all of the information received from the potential insured as necessary, and saves the information in the memory 14 for later use. In alternate embodiments, payment information can be obtained in a different manner than that of steps 235-237, or can be postponed entirely until concluding arrangements are established. Also, in alternate embodiments, information is saved by the server computer 10 throughout its operation rather than merely at step 240.

Turning to FIG. 2B, a second series of steps are performed when the insured decides that he/she is interested in proceeding to obtain a limited amount of insurance coverage, or to change the exact specifications of his/her current insurance coverage. In the case where the insured desires to obtain insurance coverage for a limited time period, the insured first provides an inquiry to the insurance company at step 250. As shown, the system only proceeds beyond step 250 once an inquiry has been received. Depending upon the embodiment, the reception of an inquiry can occur as a result of any of a variety of actions by the insured, as discussed with respect to step 205. In one embodiment, the inquiry occurs simply when the insured accesses the insurance company's web site and selects a button (e.g., by clicking on it using a mouse) for obtaining limited insurance coverage of a certain type (e.g., automobile insurance, boat insurance, etc.). The insured typically only provides an inquiry in this way because he/she is an existing insured, that is, an existing customer who has gone through the steps of FIG. 2A.

Upon receiving an inquiry from the insured, the server computer 10 at step 255 provides one or more input forms which include one or more fields for the entry of only those pieces of information that are still necessary to finalize the characteristics of the desired insurance coverage. In the embodiment of FIG. 2B, information is entered in two stages. First, the necessary information that must be provided by the insured at this time includes an identifier, such as the username and password provided earlier to the insured by the insurance company. Thus, in step 260 the server computer 10 receives the submission of an identifier from the client computer 20 of the insured. Then at step 262, the server computer 10 determines whether it recognizes the insured as identified by the identifier, and whether the insured is actually an existing insured who has established an initial arrangement with the insurance company. The server computer 10 can make this determination by comparing the identifier with the information stored in its memory 14. If the identifier is not recognized, the server computer 10 returns to step 255, so that the insured can provide more accurate information via the input form. In certain embodiments, the system will only cycle through steps 255-262 a limited number of times before it is determined that the inquiry received at step 250 was not from an existing insured, and so the system will return to step 250.

Assuming that the identifier is recognized at step 262, the server computer 10 then receives additional specific information concerning the exact limited time period for which the insured desires insurance coverage. Thus, in step 265 the server computer 10 receives submissions of limitation/specification information, where the limitation information specifies the exact time period for which insurance coverage is desired. For example, an insured who knows he is "going out" on Friday night, Sep. 1, 2000 may want to use his luxury automobile only during the evening hours, and so may provide limitation information that requests insurance coverage from 6:30 P.M. on Friday, Sep. 1, 2000 until 2:15 A.M. on Saturday, Sep. 2, 2000. In the embodiment of FIG. 2B, only a single input form is provided at step 255 in which both identification and limitation information is input. Also in that embodiment, the receiving of identification and limitation information takes place in the two steps 260 and 265, because the server computer 10 receives (or processes) the identification and limitation information separately. In alternate embodiments, steps 260 and 265 can be combined, or two or more separate input forms (or sets of input entries) are provided for the identification and limitation information and any other information (in additional steps of operation besides step 255). Additionally, in other embodiments, the receiving of identification information is not necessary because, based upon some other action of the insured, the insured's identity is already known by the system. Although the limitation information as described above relates to temporal limits on the insurance coverage, in alternate embodiments, the limitation information can also relate to other types of limitations, for example, limitations concerning geographical region, a limited number of miles to be driven, a limited number of miles to be driven during a certain time period, or a velocity restriction.

Once the identifier of the insured has been recognized and limitation information has been received by the server computer 10, the server computer processes the information at step 270 to determine, for example, whether there is some reason that the requested coverage cannot be provided, and/or the exact cost/price of the insurance coverage. If at step 272 the requested coverage cannot be provided, that is, the limits specified by the insured are unacceptable, the server computer 10 provides a response to the client computer 20 that is indicative of this fact and also possibly indicative of the reasons for the unacceptability of the request. The system then requests new or modified limitation information from the user. The system thus returns to step 265, at which it again receives new or modified limitation information from the client computer 20. To allow an insured to input this new or modified limitation information in step 265, the system in one embodiment causes an additional input form to be displayed at the client computer 20 (not shown).

The processing that occurs at step 270 varies depending upon the embodiment. In some embodiments, the processing only involves recording the requested insurance coverage information in the insurance company's database or the server computer memory 14 (or some other memory) so that there is a record of the insurance that was purchased. In such embodiments, it is seldom if ever the case that the limits specified by the insured are unacceptable, and step 272 becomes unnecessary. In other embodiments, the insurance company is constantly updating its current insurance responsibilities and so the processing involves recalculating premiums or performing other operations in response to the information provided by the insured. In such embodiments, any price quotes provided at step 225 are typically only target prices or ranges of prices, not final quotes. In the preferred embodiment, upon processing the information at step 270 and determining the limits specified by the insured to be acceptable at step 272, the server computer 10 returns a price quote to the client computer 20 (and thereby to the insured) as a confirmation that the requested insurance can be provided, and then waits for the insured to confirm that it desires the requested insurance, at step 275. In such embodiment, the server computer 10 does not bill the insured's credit card for the limited insurance coverage until it receives a confirmation from the client computer 20 via the internet 30, at step 275. However, in alternate embodiments, no confirmation from the insured is necessary before billing takes place. Upon completion of step 275, a concluding arrangement between the insured and insurance company has been established.

The system can operate similarly in the case where the insured desires to obtain insurance coverage which is limited in other ways, such as by geographical region, particularly, where the insured has previously made one selection of insurance coverage but now wishes to adjust that coverage. For example, an insured may originally have requested insurance that covered one particular region (e.g., Manhattan) but due to a change in circumstances now wishes to obtain coverage for a different region (e.g., Manhattan and Long Island). Such a change is facilitated by the embodiment of the present invention where the general characteristics governing the insurance coverage (such as the insured's identity) can be provided separately from certain specific characteristics. This is the case because, assuming the general characteristics have not changed, the insured therefore can easily modify its coverage by specifying merely a different geographic region in the input form of step 255, which limitation information is then received by the server computer 10 at step 265.

Referring to FIGS. 3A-3D, exemplary web pages are shown that can be accessed and downloaded by client computers 20 from the server computer 10 via the internet 30 in order to obtain limited amounts of insurance coverage as discussed with respect to FIGS. 2A and 2B. With respect to FIG. 3A, a first web page 310 is shown that is accessible by a potential insured using its respective client computer (e.g., client computer 20a). The web page 310 is accessed by inputting a web address (e.g., a domain name) corresponding to the insurance company's web site, by selecting a banner ad, link or bar that links or otherwise connects to the insurance company's web site, or by selecting the insurance company's web site from one or more results of a web search (e.g., by any one of a number of search engines available over the internet 30), among other methods. The first web page 310 typically includes information regarding the insurance company itself 312, and information about the insurance products offered by the insurance company 314 for which new potential insureds may sign up, among other types of information.

Figure 3:
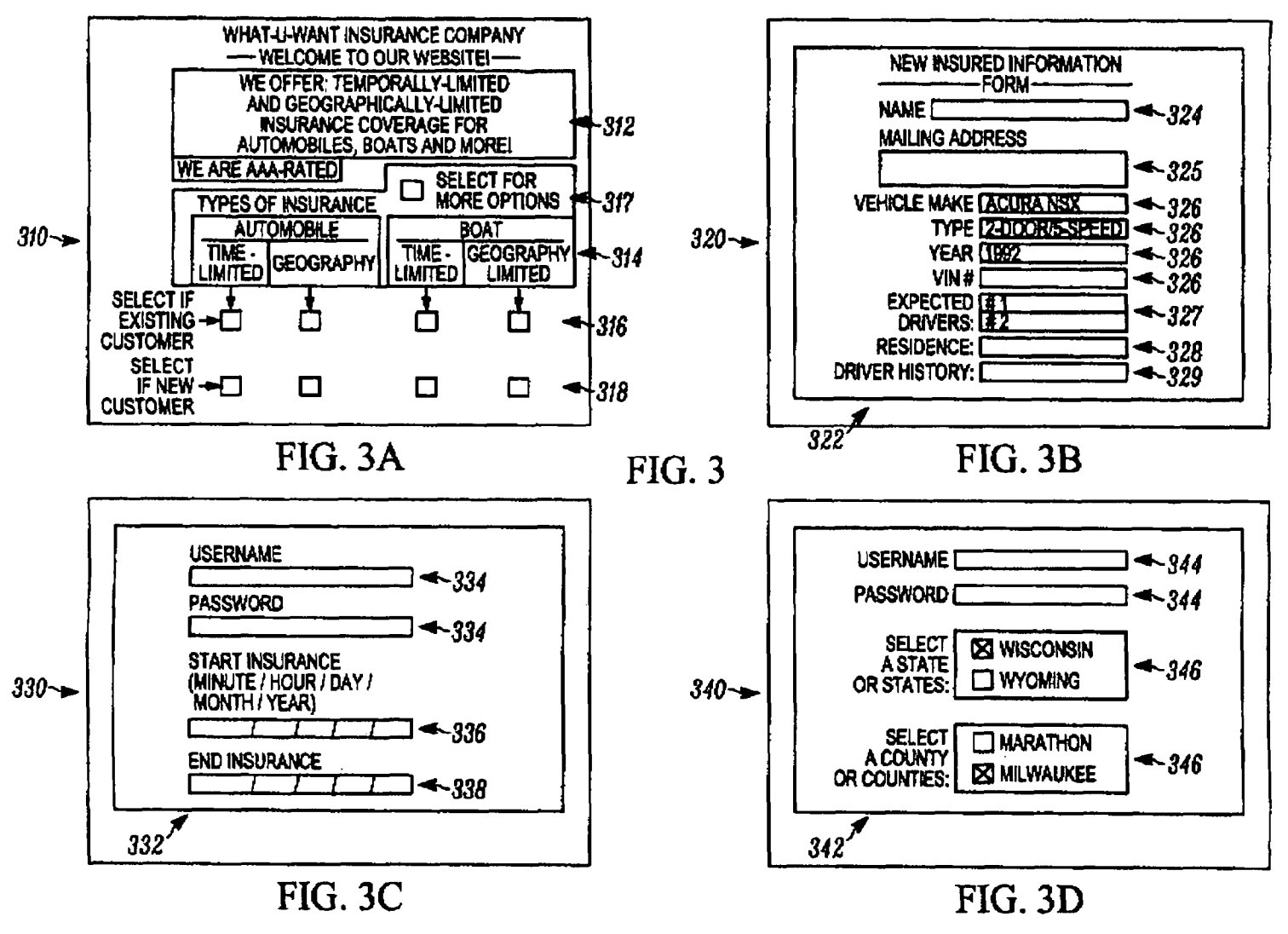

The first web page 310 also includes one or more buttons 316 that can be selected by existing insureds (persons who have already formed an initial arrangement with the insurance company) to immediately proceed to obtaining limited amounts of insurance coverage and/or to modify the existing terms of their insurance coverage, in accordance with the steps of FIG. 2B. In the embodiment shown in FIG. 3A, the buttons 316 correspond to each of the different types of insurance that are offered by the insurance company, for which an insured may already have established an initial relationship with the insurance company, e.g., temporally-limited automobile insurance, geographically-limited automobile insurance, temporally-limited boat insurance, and geographically-limited boat insurance. Depending upon the embodiment, other types of insurance can be offered instead of or in addition to these types of insurance offerings, such as temporally-limited renters' insurance, temporally limited travelers' coverage, temporally-limited life insurance, or temporally-limited or geographically-limited home insurance, and many others. In certain embodiments, the web page 310 does not display a button 316 for each of the available offerings, but rather includes (as shown in FIG. 3A) a more options button 317, which can be selected by an insured who wishes to go to an additional web page that allows selection of other insurance offerings not provided on the first web page 310. The first web page 310 further includes one or more buttons 318 that can be selected by potential insureds (new customers) to begin the process of arranging an initial relationship with the insurance company in accordance with the steps of FIG. 2A.

In alternate embodiments, there is only a single button 316 on the first web page 310 that is to be selected by existing insureds. Once the single button 316 is selected, an additional web page (not shown) listing the types of coverage that possibly pertain to the existing insured is provided, from which the existing insured can select the appropriate type of insurance pertaining to it. Likewise, only a single button 318 for new insureds exists in certain embodiments on first web page 310. In an additional embodiment, the single button 316 is replaced with a field for the entry of identifiers (e.g., username and password) corresponding to an existing insured. This may be the preferred embodiment insofar as the server computer 10, upon receiving this information, will immediately be able to determine the type of insurance relationship the insured has with the insurance company, and so will be able to determine the type of information that still must be obtained (in accordance with step 265 of FIG. 2A) from the insured to finalize a particular amount of limited insurance coverage.

As shown in the first web page 310, selectable insurance products can include automobile insurance and boat insurance, for example. In the exemplary web site of FIGS. 3A-3D, each of these available types of insurance is available in either temporally-limited form or geographically-limited form, although in alternate embodiments, the web site also (or instead) provides options for insurance coverage that is limited according to other criteria. If a potential insured selects one of the available types of insurance by clicking on one of the new insurance buttons 318 corresponding to the different types of insurance, the server computer 10 receives a signal which it interprets to be the request of a new potential insured. This signal (or the initial accessing of the first web page 310) can be understood to be the inquiry received by the system at step 205 discussed above. Upon reception and processing of this signal by the server computer 10, a second web page 320 is downloaded to the client computer 20, as shown in FIG. 3B. The second web page 320 typically provides an input form 322 in which the potential insured can provide the general information necessary to set up an initial arrangement between the insured and the insurance company, as discussed with respect to FIG. 2A.

The input form 322 shown in FIG. 3B is configured specifically to allow for automobile insurance that the insured obtains for limited amounts of time. Thus, the input form includes fields 324 and 325 for the input of information concerning the potential insured's identity and address, respectively, fields 326 for the make, type, year of manufacture, and VIN number of the automobile to be insured, a field 327 for the expected drivers of the automobile, a field 328 for the primary residence at which the automobile is based, and a field 329 for the driving history of the expected drivers of the automobile. In alternate embodiments, input fields for less or more information are provided. The providing of the second web page 320 corresponds to step 210 discussed above and, upon submission of information by the potential insured via the input form (in accordance with step 215), the server computer 10 receives the necessary personal information for determining whether and at what cost insurance can be provided and for concluding an initial arrangement with the potential insured (steps 220-240). Additional or different web pages (not shown) can be employed in addition to web page 320 to obtain additional information from the potential insured or to provide additional information to the potential insured, including information regarding credit card billing and the providing of a username and password.

Once a potential insured has completed the steps discussed with respect to FIG. 2A, including the steps relating to the second web page 320, the potential insured is then an insured who has an initial arrangement with the insurance company. Where the insured has selected the option of being able to obtain temporally-limited amounts of insurance coverage, the insured then has the capability of accessing the insurance company's web site repeatedly to specify new requests for, and to purchase, limited amounts of insurance. With respect to the embodiment of the web site shown in FIGS. 3A-3D, the insured obtains these limited amounts of insurance by accessing the first web page 310 and selecting one of the buttons 316 for an existing insured. Upon selection of the one of the buttons 316 corresponding to temporally-limited automobile insurance, the server computer 10 receives an inquiry as discussed with respect to step 250, and a third web page 330 is provided as shown in FIG. 3C, in accordance with step 255. The third web page 330 typically provides a simple input form 332 that allows the potential insured to indicate its identity and the particular limited amounts of insurance that are desired.

For example, as shown in FIG. 3C, in one embodiment where the insured desires temporally-limited insurance, the input form 332 merely includes identifier fields 334 for the insured's username and password, a start insurance field 336 in which the insured specifies the time at which it wishes insurance coverage to begin, and an end insurance field 338 in which the insured specifies the time at which it wishes insurance coverage to end/finish. In certain embodiments, the input form 332 actually includes two separate input forms, one for the input of the identifier information and the other for the limitation information. The times can be specified as normal "clock times" (e.g., according to Eastern Daylight Time), or with respect to one another (e.g., the time input into the end insurance field 338 can simply be 1 hour, indicating that the finish time is 1 hour after the start time). Further, in certain embodiments, a single piece of time information can be specified if both the start and finish times are implicitly understood from that format (e.g., the day of September 1st can be specified, where that day runs from 12:00 midnight of the morning of September 1st until 12:00 midnight of the evening of September 1st). Once this information is provided by the insured, in accordance with steps 260 and 265 discussed above, and the insured's identifier has been recognized, the server computer 10 processes the limitation information (step 270). The server computer 10 then provides a quote to the client computer 20 for the insured indicating that the insured has obtained the limited amount of coverage requested or that the insured can obtain the limited amount of coverage by providing a confirmation of his/her request (step 275). The information provided from the insured by way of the input forms 322, 332 of FIGS. 3B and 3C can be submitted by double clicking on the input forms when the insured has completed filling them out, by selecting a submit button on each respective input form (not shown), or by performing other actions.

Turning to FIG. 3D, where the insured desires geographically-limited insurance and has selected the one of the buttons 316 corresponding to that type of insurance, a fourth web page 340 with an additional input form 342 is provided. The additional input form 342 includes identifier fields 344 for the insured's username and password, and also includes one or more geographical region selecting fields 346 where the insured specifies the geographical region in which it needs the coverage. Selection of the necessary geographical region can proceed in any one of a number of ways, including selection of counties and states (as shown) or other well-defined geographic regions (e.g., zip code regions) from one or more lists, or selection of a region on a map (which would require displays of maps on the screen). Once the identifier and geographical region information is provided (in accordance with steps 260 and 265), assuming the insured's identifier is recognized, a concluding arrangement can be determined (steps 270-275).

While the foregoing specification illustrates and describes the preferred embodiments of this invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

What is claimed is:

1. A method of providing insurance coverage to a customer, the method comprising:
   (a) during a preliminary period of time:
      (1) receiving an initial inquiry from the customer;
      (2) providing an input form including at least one field for an entry of a piece of information concerning at least one of a characteristic of the customer and a characteristic of an item to be insured;
      (3) receiving the piece of information following its entry into the input form and submission;
      (4) performing processing in relation to the piece of information;
      (5) providing a preliminary indication to the customer that the customer will have an ability to order at least one of temporally-limited amounts of insurance and geographically-limited amounts of insurance; and
      (6) providing an identifier to the customer; and
   (b) at a subsequent period of time:
      (1) providing a field for an input of a limitation relating to a desired insurance coverage regarding the item, which is a customer-owned item, the limitation including a time period indication of a time period less than a month;
      (2) receiving the limitation at a central processor as provided by way of a customer-operated terminal;
      (3) performing processing in relation to the limitation to determine whether the desired insurance coverage as restricted by the limitation can be provided;
      (4) sending a confirmation to the customer-operated terminal concerning whether the desired insurance coverage corresponding to the limitation can be provided;
      (5) receiving a further signal from the customer-operated terminal indicating that the desired insurance coverage is still desired;
      (6) concluding an arrangement so that the desired insurance coverage concerning the time period is provided to the customer;
      (7) receiving credit card information from the customer, wherein the central processor does not bill a customer credit card for the desired insurance coverage as restricted by the limitation until the central processor receives a confirmation from the customer-operated terminal via an internet-type connection that a newly-quoted price for the desired insurance coverage is satisfactory; and
      (8) recording information regarding the desired insurance coverage as restricted by the limitation in an insurance company database.

* * * * *